May 15, 1928.
L. N. CRICHTON
REGULATION SYSTEM
Filed July 6, 1923
1,669,505
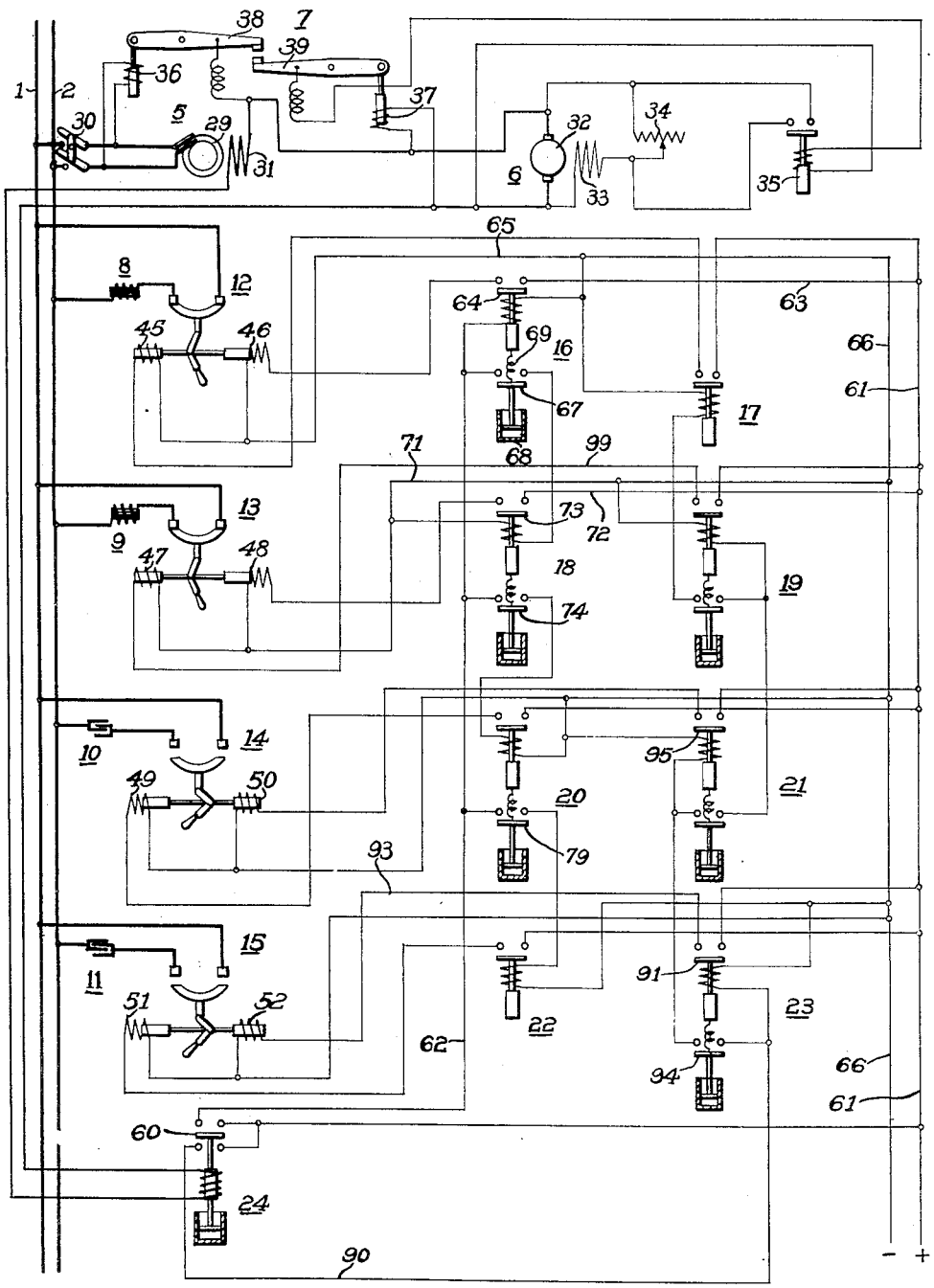
WITNESSES:
INVENTOR
Leslie N. Crichton.
BY
ATTORNEY Patented May 15, 1928.

1,669,505

UNITED STATES PATENT OFFICE.

LESLIE N. CRICHTON, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATION SYSTEM.

Application filed July 6, 1923. Serial No. 649,799.

My invention relates to regulating systems for electrical-power transmission lines or systems and, particularly, to regulating systems for the transmission of power at high voltages over long distances.

In a copending application of Frank G. Baum, Serial No. 569,704, filed June 20, 1922, patented February 8, 1927, No. 1,617,007, is shown a system that is particularly adapted to high-voltage, long-distance transmission of electrical power, this system embodying a plurality of synchronous condensers spaced along the line and adapted to provide the wattless current required in each section of the line between condenser stations, whereby a substantially constant voltage and power-factor may be maintained throughout a relatively long transmission line.

One object of my invention is to provide a system of the above-indicated character wherein a static capacitance device or an inductive device, or both, are adapted to be selectively rendered active with respect to a main synchronous condenser in accordance with certain electrical conditions thereof; for example, the degree of field excitation of the condenser, in order to keep the synchronous condenser operating at loads within its range.

Another object of my invention is to provide a transmission system of the type set forth above comprising, in addition to a synchronous condenser in a station, one or more static condensers and inductive reactors that are adapted to be successively connected across the supply circuit or transmission line in the event of a variation in the power factor thereof, thus assisting the desired action of the synchronous condenser, irrespective of the direction of departure of the power-factor from the desired unity or other value.

Other objects of my invention will become evident from the following detailed description, taken in conjunction with the accompanying drawing, the single figure of which is a diagrammatic view of a system of transmission and regulation organized in accordance with my present invention.

Referring to the drawing, the system here shown comprises a supply circuit or transmission line which, for the sake of simplicity, is shown as of the single-phase type embodying conductors 1 and 2, to which a synchronous condenser 5 is connected, the condenser being provided with an exciter 6, and a regulator 7 being utilized in conjunction with the exciter 6 to maintain a substantially constant voltage upon the supply circuit. For assisting the regulating action of the synchronous condenser 5, a plurality of inductive devices or the equivalent 8 and 9, are provided, and also a plurality of static capacitance devices or condensers 10 and 11. It will be understood that the number of inductive and condensive devices that are employed is immaterial to the present invention, which is adapted to utilize any number of such devices that are necessary to meet the requirements of any particular installation. A plurality of main switches or circuit-breakers 12, 13, 14 and 15 are adapted to connect the inductive devices 8 and 9 and the condensers 10 and 11, respectively, across the supply circuit under predetermined electrical conditions of the synchronous condenser 5, as hereinafter set forth in detail.

In addition, a plurality of pairs of relay devices are associated with each of the circuit-breakers to effect the opening or the closure thereof. For example, relay devices 16 and 17 are respectively associated with the opening and closing coils of the circuit-breaker 12 and the remaining relay devices 18 to 23, inclusive, are similarly associated in pairs with the other circuit-breakers 13, 14 and 15.

A master relay or electromagnet 24 is energized in accordance with the degree of excitation of the synchronous condenser 5 for the purpose of selectively controlling, in the first instance, the various relay devices 16 to 23, inclusive, and through the agency thereof the respective circuit-breakers 12 to 15, inclusive, and the associated inductive and condensive devices 8 to 11, inclusive. The relay 24 normally occupies its illustrated normal position.

I desire it to be understood that, whereas, for the sake of simplicity and convenience, a single-phase synchronous condenser and transmission line is illustrated, in actual practice a three-phase system would probably be employed. However, for the sake of illustrating the principles and advantages of my invention, its application to a single-phase system is deemed sufficient.

The synchronous condenser 5 comprises a stator or armature winding 29 that is adapted to be connected to the transmission line by means of a suitable switching device, indicated at 30. A field winding 31 for the synchronous condenser is adapted to be energized from the armature winding 32 of the exciter 6, the actuating coil of the master relay 24 being also connected in circuit with the synchronous condenser field winding 31. An exciting field winding 33 for the exciter machine 6 is connected across the armature terminals thereof through a variable resistor 34, whereby the degree of excitation of the synchronous condenser may be controlled either manually or by the regulator 7, as desired, to thereby vary the amount of leading or lagging current that is delivered or produced by the synchronous condenser 5. In this way, the power-factor and voltage of the transmission line may be regulated in accordance with a familiar practice.

In order to maintain the voltage of the main transmission line substantially constant, a relay device 35, which is governed by the vibratory regulator 7, is adapted to intermittently short-circuit the field rheostat 34 for the exciter 6. The regulator 7 has one control magnet 36 connected to the transmission line conductors 1 and 2 for controlling the position of a floating lever or contact-bearing arm 38. A second control magnet 37 is connected across the terminals of the exciter armature 32 and controls the position of a second floating lever or contact-bearing arm 39. The engagement of the two contact-bearing arms 38 and 39, in accordance with the well-known vibratory action of this type of regulator, serves to energize the actuating coil of the relay device 35, whereby the field rheostat 34 of the exciter is intermittently and rapidly short-circuited to produce the desired regulating action.

The circuit-breakers 12 to 15, inclusive, may be of any well-known type and are here shown as being respectively provided with separate closing and opening coils. For example, the circuit-breaker 12 is provided with a closing coil 45 and a separate opening coil 46, which are respectively governed by the relay devices 17 and 16, as hereinafter more fully set forth. The remaining circuit-breakers 13, 14 and 15 are similarly provided with closing and opening coils 47 to 52, inclusive, and are likewise governed by the corresponding pairs of relay devices 18 to 23, inclusive, as previously mentioned.

Assuming that the various illustrated devices occupy the respective positions shown and that the synchronous condenser 5 is operating, in the event of a tendency to decrease the voltage and power-factor of the transmission line below the desired value, the excitation of the synchronous condenser field winding 31 is suitably increased by means of the regulator 7, whereby the familiar inherent regulating action of the synchronous condenser will serve to increase the power-factor and voltage to the desired extent. At the same time, in order to automatically assist in the desired regulation of power-factor, the master relay 24 will be raised to its upper position by reason of the increase in the current traversing the synchronous condenser field winding 31.

Consequently, an auxiliary circuit is established from a positively-energized auxiliary supply conductor or bus-bar 61 through the movable contact member 60 of the master relay 24, conductor 62, actuating coil of relay 16 and thence to negative conductor 66 of the auxiliary supply circuit. The closure of relay 16 completes a further circuit from supply conductor 61 through conductor 63, upper movable conductor 64 of the relay 16, opening coil 46 of the circuit-breaker 12 and conductor 65 to the negative supply conductor 66. The inductive device 8 is thus disconnected from the transmission line to assist, to a certain extent, in the desired increase of the power-factor thereof.

In case the increased excitation of the synchronous condenser 5 is maintained after the action of the circuit-breaker 12, a further circuit is established from conductor 62 through the lower contact member 67 of relay device 16. It will be noted that a predetermined time element is required after the closure of the upper contact member 64 of the relay device 16 before the lower contact member 67 can be actuated to its closed position. This result is effected by the provision of a flexible support 69 for the contact member 67 and a suitable dash-pot 68. It will be understood that any other well-known time-element or retarding device may be utilized in lieu of that illustrated. Upon the closure of contact member 67, the circuit is continued through the actuating coil of relay device 18 to conductor 71 and negative supply conductor 66. The closure of relay device 18 establishes another circuit from positive supply conductor 61 through conductor 72, upper contact member 73 of relay device 18 and opening coil 48 of circuit-breaker 13. Consequently, the second inductive device 9 is thus disconnected from the transmission line to assist in the desired increase of power-factor.

If the master relay 24 still occupies its upper position corresponding to increased excitation of the synchronous condenser field winding 31, a further circuit is established through the retarded lower contact member 74 of the relay device 18 and the actuating coil of relay device 20. The closure of the relay device 20 energizes closing coil 49 of the circuit-breaker 14, thereby connecting static condenser 10 across the transmission-line conductors 1 and 2 to further assist in the desired power-factor regulating purpose.

In the event that the master relay 24 still occupies its upper position, a further circuit is established through the retarded lower contact device 79 of relay device 20 and the actuating coil of relay device 22. The closure of this relay device serves to effect the energization of closing coil 51 of circuit-breaker 15, thereby connecting the second static condenser 11 across the transmission line for the desired purpose.

It will be appreciated that any desired number of inductive or condensive devices may be connected to, or disconnected from, the transmission line in accordance with the principles of operation just set forth, so that the requirements of any particular installation may be satisfactorily met.

If, on the other hand, a tendency arises to increase the voltage and power-factor above the desired value, the regulator 7 automatically operates to cause a decrease in the current traversing the synchronous condenser field winding 31, in order to produce a lower-power-factor of the transmission line, the master relay 24, by reason of such decreased field current, assumes its lower position, whereby a circuit is first established from the positive supply conductor 61 through contact member 60 of the relay 24, conductor 90 and the actuating coil of the relay device 23. The closure of this relay device establishes a new circuit through the opening coil of the circuit-breaker 15, whereby the condenser device 11 is disconnected from the transmission line to assist in reducing the power-factor thereof.

If the master relay 24 remains in its lower position, another circuit is then established through the retarded contact member 24 of relay device 23 and the actuating coil of relay device 21. The closure of this relay device likewise effects the energization of opening coil 50 of the circuit-breaker 15, whereby the static condenser 10 is also disconnected from the transmission line for the desired purpose.

In a similar manner, the actuating coils of the relay devices 19 and 17 are successively energized, depending upon the time elements thereof to, in this case, cause the closing of the circuit-breakers 13 and 12, successively. Consequently, the inductive devices 9 and 8 are consecutively connected to the transmission line to assist in reducing the angle of lead of the line current, as desired.

It will be noted that the order of operation of the several circuit-breakers is exactly reversed when it is desired to decrease the power-factor of the transmission line, or increase the angle of line-current lag, from that employed when it is desired to increase such power-factor. Inasmuch as each of the relay devices 16 to 23, inclusive, may be readily designed to close or "pick up" at a higher current value than that at which it opens or "drops out", it will be evident that no "hunting" of the various circuit-breakers will be possible in the present system.

If the static condensers are relatively small in capacity compared with the rotating or synchronous condensers, the scheme described above, while relatively simple, will undoubtedly be adequate for the purpose. However, if the total static capacity is greater than that of the synchronous condenser, a single relay device may be arranged to connect sections of the static condensers, one at a time, across the supply circuit, as will be understood.

It will be seen that I have thus provided a transmission system that is regulated to maintain the desired power-factor conditions by means of the usual synchronous condenser, while, in addition, automatic means in the form of inductive or capacitance devices, are connected to or disconnected from the transmission line, depending upon the type of assistance that it is desired to give to the synchronous condenser; that is, whether it is desired to increase or decrease the power-factor of the transmission line.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a regulator system, the combination with a supply circuit, a synchronous dynamo-electric machine connected thereto, and a regulator for said machine to maintain a substantially constant voltage upon said supply circuit, of a plurality of capacitance devices and inductive devices adapted to be connected to said circuit, a plurality of relays adapted to respectively successively control said capacitance and inductive devices and a master electromagnet energized in accordance with a predetermined machine condition for selectively governing said relays.

2. In a regulator system, the combination with a supply circuit, a synchronous dynamo-electric machine connected to said circuit, capacitive devices and inductive devices adapted to be connected thereto, and a regulator for said dynamo-electric machine, of means energized in accordance with the excitation of said machine for connecting said capacitive and inductive devices to said circuit.

3. In a regulator system, the combination with a supply circuit, a synchronous condenser connected thereto, an exciter therefor, and a vibratory regulator adapted to maintain a substantially constant supply-circuit voltage, of means for controlling the supply-circuit voltage comprising a plurality of static condensers and of reactance devices adapted to be connected to said supply circuit, electromagnetic means adapted to control said static condensers and reactance devices, relays adapted to successively control said electromagnetic means, and a master relay energized in accordance with a field-winding condition of said machine for selectively energizing said relays.

4. An electrical system comprising normally operative rotative capacitive means, static reactive means adapted to be connected in circuit therewith, and means governed by said rotative capacitive means for connecting said static reactive means under predetermined machine conditions.

5. An electrical system comprising a synchronous condenser, a static condenser, means for varying the excitation of said synchronous condenser, and means responsive to predetermined conditions of said excitation for rendering said static condenser operative.

6. An electrical system comprising a synchronous condenser, a static condenser, means for rendering said synchronous condenser normally operative, and means responsive to the degree of excitation thereof for rendering said static condenser operative.

7. An electrical system comprising an alternating-current supply circuit, a synchronous condenser connected thereto, a static condenser, and means rendered active in the event of variations of the reactive volt-amperes exchanged with said supply circuit for connecting said static condenser to said supply circuit.

8. An electrical system comprising rotative capacitive means, static capacitive and inductive devices, and means for selectively connecting said devices in parallel relation to said rotative capacitive means.

9. An electrical system comprising a synchronous condenser, static capacitance and inductive devices, and means responsive to predetermined electrical conditions of said condenser for controlling the connection of said devices in parallel relation to said synchronous condenser.

10. An electrical system comprising rotative and static capacitive means and inductive means adapted to be selectively rendered active.

11. An electrical system comprising normally operative rotative capacitive means, and static capacitive and inductive devices adapted to be connected in circuit therewith under predetermined machine conditions.

12. An electrical system comprising a normally operative synchronous condenser, reactive means and means responsive to the degree of excitation of said synchronous condenser for connecting said reactive means across said condenser.

13. An electrical system comprising a normally operative synchronous condenser, capacitive and inductive devices, and means responsive to the degree of field excitation of said synchronous condenser for selectively connecting said devices in parallel relation to said condenser.

14. In a regulator system, the combination with a supply circuit, a synchronous dynamo-electric machine connected thereto, an exciter therefor and a regulator adapted to maintain a substantially constant voltage upon said supply circuit, of a plurality of capacitance devices and inductive devices adapted to be connected to said circuit, a plurality of relays adapted to respectively successively control said capacitance and inductive devices and a master electromagnet energized in accordance with the excitation of said machine for selectively governing said relays.

15. In a regulator system, the combination with a supply circuit, a synchronous dynamo-electric machine, capacitance devices and inductive devices adapted to be connected thereto, an exciter for said dynamo-electric machine, and a regulator therefor, of means adapted to selectively govern said capacitance and inductive devices comprising a control magnet energized in accordance with the excitation of said machine and a plurality of successively operative relays.

16. An electrical system comprising an alternating-current supply circuit, a synchronous condenser connected thereto, static capacitance and inductive devices, and means rendered active in the event of variations of the reactive volt-amperes exchanged with said supply circuit for selectively connecting said devices to said supply circuit.

17. An electrical system comprising an alternating-current supply circuit, a synchronous condenser connected thereto, static capacitance and inductive devices, and means rendered active in the event of a decrease in the reactive volt-amperes exchanged with said circuit for connecting said inductive device to said supply circuit and in the event of an increase in the reactive volt-amperes exchanged with said circuit for connecting said capacitance device to said supply circuit.

18. An electrical system comprising an alternating-current supply circuit, a synchronous condenser connected thereto, static capacitance and inductive devices, and means rendered active in the event of a decrease in the reactive volt-amperes exchanged with said circuit for connecting said inductive device to said supply circuit and for disconnecting said capacitance device therefrom and in the event of an increase in such reactive volt-amperes for connecting said capacitance device to said supply circuit and disconnecting said inductive device therefrom.

19. The combination with a long, high-voltage transmission line, of a substation including a synchronous dynamo-electric machine connected thereto for regulating the voltage thereof at a given point, electro-responsive means for so exciting said machine as to maintain the desired voltage conditions, a static inductive device adapted to be connected across the line at said substation, and electro-responsive means for keeping said static inductive device in circuit only during line conditions corresponding to the lower end of the excitation-range of said machine.

20. The combination with a long, high-voltage transmission line, of a substation including a synchronous dynamo-electric machine connected thereto for regulating the voltage thereof at a given point, electro-responsive means for so exciting said machine as to maintain the desired voltage conditions, variable static reactance apparatus being connected across the line at said substation, and electro-responsive means operative during line conditions corresponding to an intermediate condition in the range of excitation of said machine for varying said static reactance in such direction as to assist said machine at one end of its excitation-range.

In testimony whereof, I have hereunto subscribed my name this 27th day of June, 1923.

LESLIE N. CRICHTON.